(12) United States Patent
Wu

(10) Patent No.: US 8,750,565 B2
(45) Date of Patent: Jun. 10, 2014

(54) ADJUSTING DISPLAY FORMAT IN ELECTRONIC DEVICE

(75) Inventor: Tung-Lin Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 240 days.

(21) Appl. No.: 13/328,019

(22) Filed: Dec. 16, 2011

(65) Prior Publication Data

US 2012/0242705 A1 Sep. 27, 2012

(30) Foreign Application Priority Data

Mar. 24, 2011 (TW) .............................. 100110233 A

(51) Int. Cl.
*G06K 9/00* (2006.01)
(52) U.S. Cl.
USPC .......................................................... 382/103
(58) Field of Classification Search
USPC ................. 382/103, 106, 181, 190, 298, 301; 348/63, 469, 561, 581; 708/204, 208
See application file for complete search history.

(56) References Cited

U.S. PATENT DOCUMENTS

| | | | | |
|---|---|---|---|---|
| 5,436,681 A | * | 7/1995 | Michaels | 351/240 |
| 5,668,743 A | * | 9/1997 | Kushelvesky | 702/158 |
| 5,739,893 A | * | 4/1998 | Karasawa et al. | 351/158 |
| 7,343,026 B2 | * | 3/2008 | Niwa et al. | 382/103 |
| 7,379,078 B1 | * | 5/2008 | Gossweiler et al. | 345/660 |
| 8,209,635 B2 | * | 6/2012 | Thorn | 715/863 |
| 8,510,462 B2 | * | 8/2013 | Riggert et al. | 709/232 |
| 8,525,930 B2 | * | 9/2013 | Hsieh | 348/581 |
| 2004/0160386 A1 | * | 8/2004 | Michelitsch et al. | 345/10 |
| 2005/0229200 A1 | * | 10/2005 | Kirkland et al. | 725/12 |
| 2007/0080939 A1 | * | 4/2007 | Isozu | 345/158 |
| 2007/0159470 A1 | * | 7/2007 | Jeng et al. | 345/204 |
| 2008/0074444 A1 | * | 3/2008 | Morikawa et al. | 345/660 |
| 2008/0199049 A1 | * | 8/2008 | Daly | 382/107 |
| 2008/0316372 A1 | * | 12/2008 | Xu et al. | 348/739 |
| 2009/0055853 A1 | * | 2/2009 | Jung et al. | 725/10 |
| 2009/0141147 A1 | * | 6/2009 | Alberts et al. | 348/240.99 |
| 2009/0164896 A1 | * | 6/2009 | Thorn | 715/700 |
| 2009/0169058 A1 | * | 7/2009 | Chen | 382/106 |
| 2009/0284594 A1 | * | 11/2009 | Mitsuhashi | 348/135 |
| 2010/0188426 A1 | * | 7/2010 | Ohmori et al. | 345/660 |
| 2011/0141114 A1 | * | 6/2011 | Chen et al. | 345/428 |
| 2011/0193838 A1 | * | 8/2011 | Hsu | 345/207 |
| 2011/0243388 A1 | * | 10/2011 | Sakaguchi et al. | 382/103 |
| 2011/0254846 A1 | * | 10/2011 | Lee et al. | 345/427 |
| 2012/0183181 A1 | * | 7/2012 | You | 382/118 |
| 2012/0254779 A1 | * | 10/2012 | Ollivierre et al. | 715/764 |
| 2012/0287163 A1 | * | 11/2012 | Djavaherian | 345/667 |
| 2013/0029723 A1 | * | 1/2013 | Das et al. | 455/557 |

* cited by examiner

*Primary Examiner* — Jason M Repko
*Assistant Examiner* — Shervin Nakhjavan
(74) *Attorney, Agent, or Firm* — Novak Druce Connolly Bove + Quigg LLP

(57) ABSTRACT

A display format adjustment system includes a display control module, a distance measurement module, a timer controller, and a display format determination module. The display control module displays content in a first display format on a display. The distance measurement module continuously measures the current distance between a viewer and the display screen. The timer controller starts a timer. Once the current distance changes, the timer controller restarts the timer. If the timer reaches a predetermined time, the display format determination module determines a second display format based on the first display format and the display control module displays the content in the second display format.

18 Claims, 5 Drawing Sheets

ADJUSTING DISPLAY FORMAT IN ELECTRONIC DEVICE

CROSS-REFERENCE TO RELATED APPLICATIONS

Relevant subject matter is disclosed in co-pending U.S. patent applications entitled "ADJUSTING DISPLAY FORMAT IN ELECTRONIC DEVICE", U.S. application Ser. No. 13/327,998, Filed on Dec. 16, 2011, and "ADJUSTING PRINT FORMAT IN ELECTRONIC DEVICE", U.S. application Ser. No. 13/328,008, Filed on Dec. 16, 2011.

BACKGROUND

1. Technical Field

The disclosure generally relates to a system and a method for adjusting display format in an electronic device.

2. Description of Related Art

Generally, a desktop computer or a mobile terminal includes a display screen for communicating with a viewer. When content is being displayed in an unchanging format (e.g. a fixed font size and/or a fixed image size) on the display screen and a viewer keeps viewing the content at a constant view distance for quite a long time period, it may do harm to the eyes of the viewer. Therefore, there is a need for a technique for automatically adjusting the display format of the displayed content to require the viewer to refocus his eyes, and/or move his head towards or away from the display screen.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
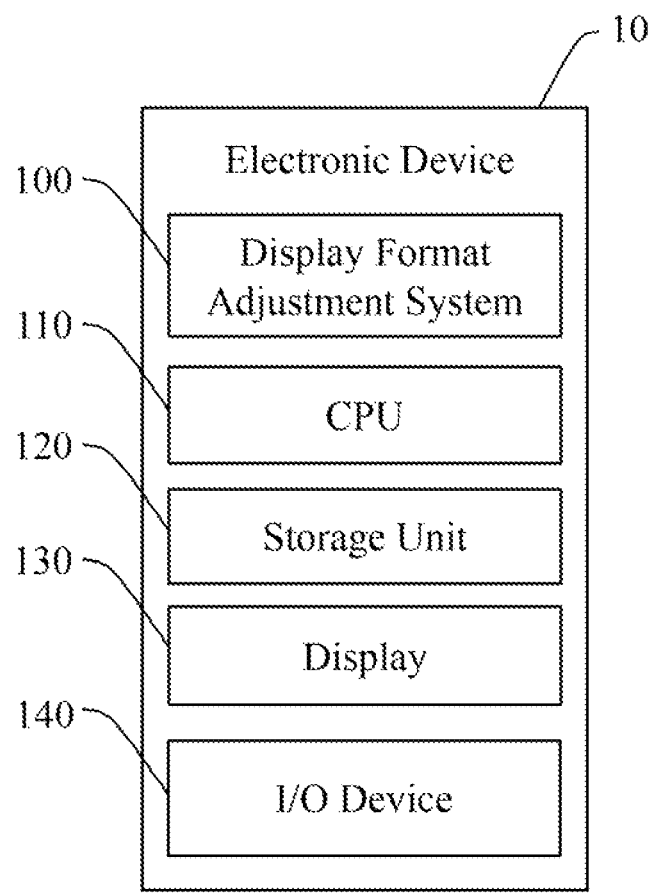
FIG. 1 is a schematic block diagram of one embodiment of an electronic device with a display format adjustment system.

FIG. 1 is a schematic block diagram of one embodiment of an electronic device 10. In one embodiment, the electronic device 10 includes a display format adjustment system 100, at least one central processing unit (CPU) 110, a storage unit 120, a display 130, and other I/O devices 140. The electronic device 10 implements the functions of the display format adjustment system 100. The electronic device 10 can be a general purpose computing device such as a desktop computer, a tablet computer, a personal digital assistant (PDA), or a smart phone.

The storage unit 120 may be any form of volatile or non-volatile storage, including, for example, RAM, ROM, EPROM, flash memory, a magnetic disk such as an internal hard disk or a removable disk, an optical disk such as a CD-ROM, or any other storage device which can be used to store the desired information and which can be accessed by the display format adjustment system 100. The storage unit 120 may store machine-executable instructions, data, and various programs, such as an operating system and one or more application programs, all of which may be processed by the CPU 110. The display 130 can be a liquid crystal display (LCD) or a cathode-ray tube (CRT) display. The electronic device 10 may include one or more I/O devices 140 such as a keyboard, a mouse, a touch pad, other pointing device, or an image capture device. The storage unit 120, the display 130 and the other I/O devices 140 are connected to the CPU 110 through a system bus (not shown in FIG. 1).

Figure 2:
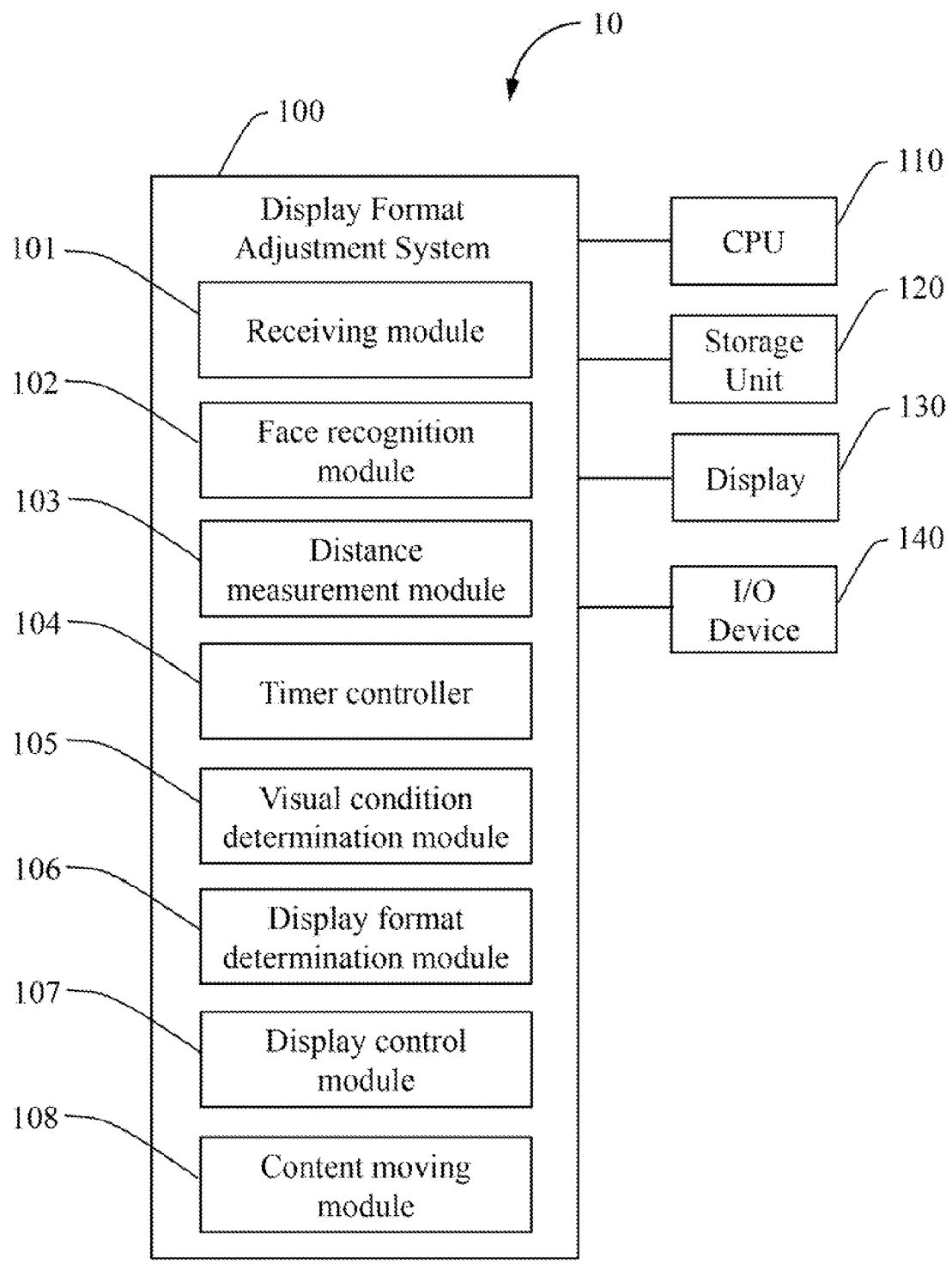
FIG. 2 is a schematic diagram of one embodiment of the function modules of the display format adjustment system of FIG. 1.

FIG. 2 illustrates one embodiment of the function modules of the display format adjustment system 100. In one embodiment, the display format adjustment system 100 includes a receiving module 101, a face recognition module 102, a distance measurement module 103, a timer controller 104, a visual condition determination module 105, a display format determination module 106, a content moving module 107, and a display control module 108. Each of the modules 101-108 may be a software program including one or more computerized instructions that are stored in the storage unit 120 and executed by the CPU 110.

The receiving module 101 may receive content for displaying in a starting, or default, display format (original display format). The content may include text and/or images. The original display format may include text font size information and/or image size information for defining the appearance and the style of the content when it is being displayed on the display 130. A text font size may include the height and width, such as 18×18 pixels, to define a size of a text font. An image size may include the height and width, such as 320×480 pixels, to define a size of an image.

The face recognition module 102 may recognize the face of a viewer in front of the display 130. The face recognition module 102 may capture an image of the viewer using a camera and identify the face of the viewer through the captured image.

The distance measurement module 103 is installed in the electronic device 10 for taking continuous measurements of the distance between the face of the viewer and the display 130. The distance measurement module 103 may use one or more of a variety of distance detecting technologies such as ultrasonic, infrared and lasers.

The timer controller 104 may control and manage one or more timers. When the distance measurement module 103 is initiated, the timer controller 104 may start a first timer. When the current view distance between the face of the viewer and the display 130 has changed, the timer controller 104 may restart the first timer.

Figure 3:
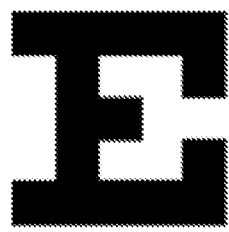
FIG. 3 shows an example of a visual acuity test chart.

The visual condition determination module 105 may determine the viewing abilities, or the sharpness of vision, (visual condition) of the viewer. In one embodiment, the visual condition determination module 105 may receive a visual acuity index input by a particular viewer. In another embodiment, the visual condition determination module 105 may display a visual acuity test chart on the display. FIG. 3 shows an example of a visual acuity test chart (a Snellen chart is illustrated). The Snellen chart is displayed with eleven lines of block letters. The smallest row that can be read accurately indicates the visual acuity of the viewer. The identification number of the smallest row readable by the viewer can serve as a visual acuity index of the viewer. The visual condition determination module 105 may determine the visual acuity index by testing the viewer by means of the visual acuity test chart. According to the visual acuity index determined by testing, the visual condition determination module 105 may determine a minimal size. The minimal size is a size of which a visual element smaller than is unrecognizable for the viewer. The minimal size may include the height and width. For example, the visual condition determination module 105 may determine that the visual acuity index of a particular viewer is "6", and the minimal size which correlates to visual acuity index "6" may be 18×18 pixels.

The display format determination module 106 may determine a first display format based on both the original display format and the visual condition of the viewer. The display format determination module 106 may obtain the size of the first display format by using an equation as follows:

$$\begin{cases} S_1 = S_0, & (S_{min} \geq S_{va}) \\ S_1 = S_0 * (S_{va}/S_{min}), & (S_{min} < S_{va}) \end{cases}$$

where $S_1$ represents the size of the first display format, $S_0$ represents the size of the original display format, $S_{va}$ represent the minimal size according to the visual acuity index, and $S_{min}$ represents the size of the smallest visual element within the original display format.

When the first display format has been determined, the display control module 107 may display the content in the first display format on the display 130.

When the first timer reaches a first predetermined time (e.g. 15 minutes), the display format determination module 106 may determine a second display format based on the first display format, and the display control module 107 may accordingly display the content in the second display format on the display 130. The display format determination module 106 may obtain the size of the second display format by using an equation as follows:

$$S_2 = S_1 * (K * \sin(L * T_{view}) + N)$$

where $S_2$ represents the size of the second display format, $S_1$ represents the size of the first display format, $T_{view}$ represents a period of time which has passed, according to the first timer, and K, L and N represent constants, such as 1, 1.2, and 1.

When the first predetermined time period has elapsed according to the first timer, the content moving module 108 may move the displayed content from a first location to a second location on the display 130.

In one embodiment, the timer controller 104 may start a second timer when the first timer reaches the first predetermined time. When the second timer reaches a second predetermined time (e.g. 10 minutes), the display control module 104 may return the display of content back to the first display format, and the content moving module 108 may move the displayed content from the second location back to the first location on the display 130.

The distance measurement module 103 may measure a first view distance between the face of the viewer and the display 130 when the visual condition determination module 105 determines the visual condition of the viewer. When the viewer moves himself nearer to or farther away from the display 130, the distance measurement module 103 may measure a second view distance between the face of the viewer and the display 130.

The display format determination module 106 may determine a third display format based on the first display format and a relation between the first view distance and the second view distance. The display format determination module 106 may obtain size of the third display format by using an equation as follows:

$$\begin{cases} S_3 = S_1, & (D_2 < D_1) \\ S_3 = S_1 * (D_2/D_1), & (D_2 \geq D_1) \end{cases}$$

where $S_3$ represents the size of the third display format, $S_1$ represents the size of the first display format, $D_2$ represents the second distance, and $D_1$ represents the first distance.

When the third display format has been determined, the display control module 107 may display the content in the third display format on the display 130.

Figure 4:
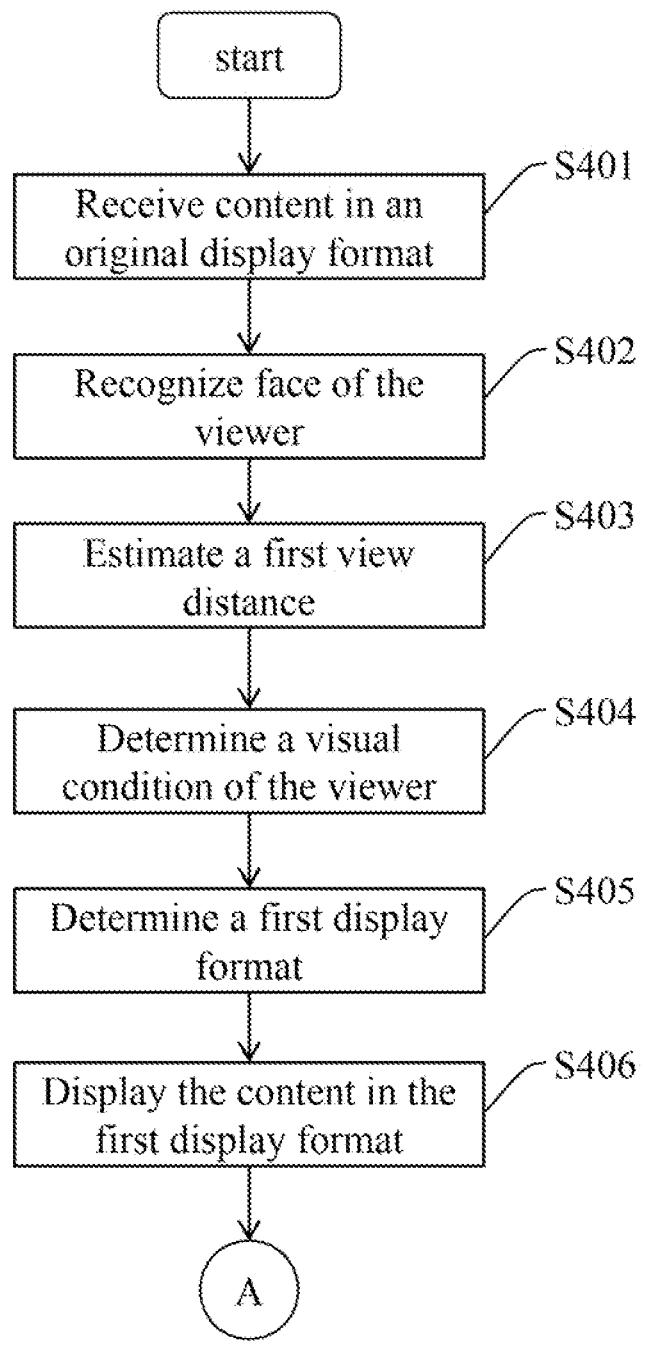
FIG. 4 and FIG. 5 show an operational flow diagram representing one embodiment of a method for adjusting a display format using the display format adjustment system of FIG. 1.
Figure 5:
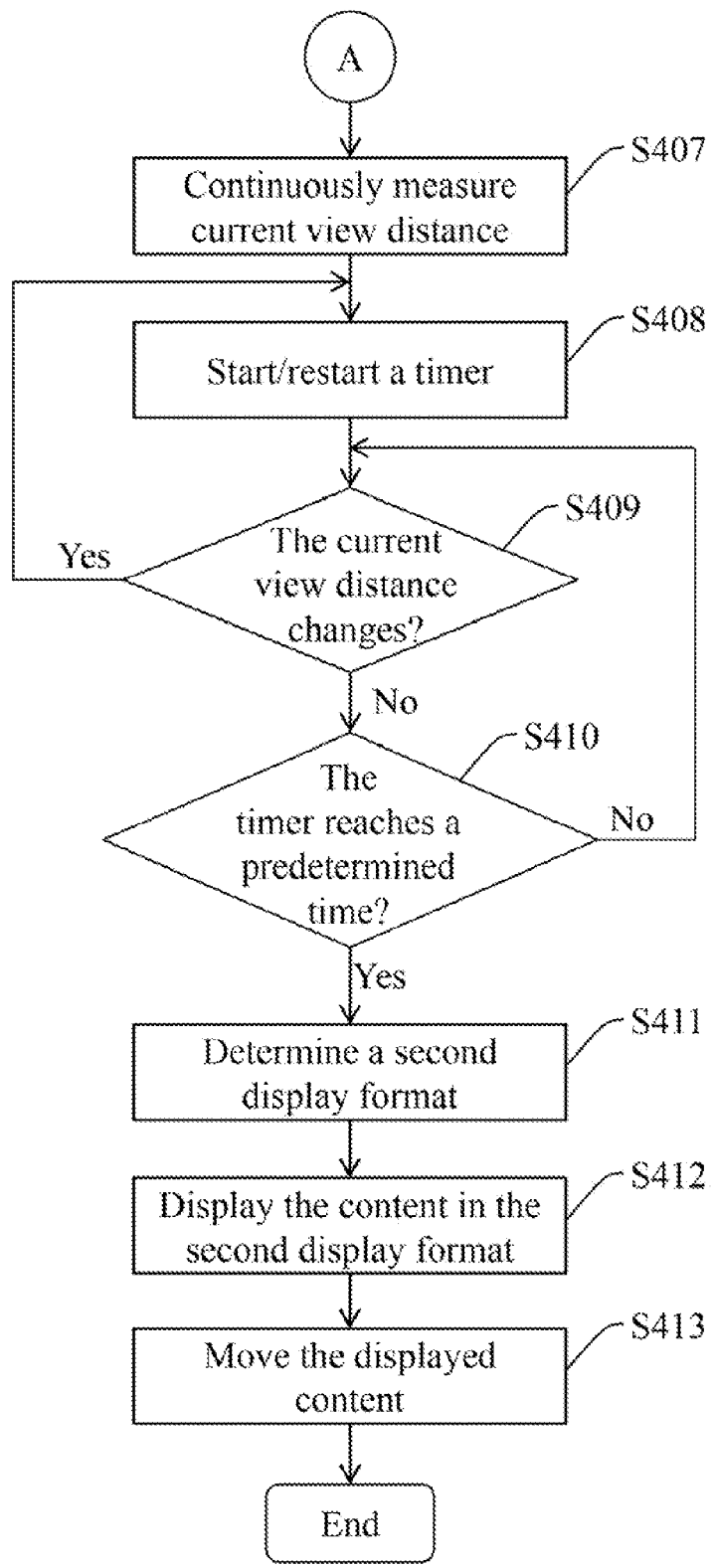

FIG. 4 and FIG. 5 show a flowchart illustrating one embodiment of a method for adjusting a display format using the display format adjustment system of FIG. 1. The method may include the following steps.

In step S401, the receiving module 101 receives content for displaying in an original display format as previously defined.

In step S402, the face recognition module 102 recognizes the face of a viewer in front of the display 130.

In step S403, the distance measurement module 103 measures a first view distance between the face of the viewer and the display 130.

In step S404, the visual condition determination module 105 determines the visual condition (as previously defined) of the viewer. The visual condition determination module 105 displays a visual acuity test chart on the display 130, and determines a visual acuity index applicable to the viewer by testing the viewer using the visual acuity test chart. According to the visual acuity index as determined, the visual condition determination module 105 determines a minimal size. The minimal size is a size of which a visual element smaller than is unrecognizable for the viewer.

In step S405, the display format determination module 106 determines a first display format based on both the original display format and the visual condition of the viewer. The display format determination module 106 obtains the size of the first display format by using an equation as follows:

$$\begin{cases} S_1 = S_0, & (S_{min} \geq S_{va}) \\ S_1 = S_0 * (S_{va}/S_{min}), & (S_{min} < S_{va}) \end{cases}$$

where $S_1$ represents the size of the first display format, $S_0$ represents the size of the original display format, $S_{va}$ represent the minimal size relative to the visual acuity index, and $S_{min}$ represents the size of the smallest visual element within the original display format.

In step S406, the display control module 107 displays the content in the first display format on the display 130.

In step S407, the distance measurement module 103 takes continuous measurements of the view distance between the face of the viewer and the display 130.

In step S408, the timer controller 104 starts a timer or restarts the timer if the timer has already started running.

In step S409, if the current view distance changes, the flow goes to step S408. As long as the current view distance does not change, the flow goes to step S410.

In step S410, if and when the timer has reached a predetermined time (e.g. 15 minutes), the flow goes to step S411. Otherwise, the flow remains suspended in step S409.

In step S411, the display format determination module 106 determines a second display format based on the first display format. The display format determination module 106 obtains the size of the second display format by using an equation as follows:

$$S_2 = S_1 * (K * \sin(L * T_{view}) + N)$$

where $S_2$ represents the size of the second display format, $S_1$ represents the size of the first display format, $T_{view}$ represents a time period measured by the timer, and K, L and N represent constants, such as 1, 1.2, and 1.

In step S412, the display control module 107 displays the content in the second display format on the display 130.

In step S413, the content moving module 108 moves the displayed content from the current location to another location on the display 130.

In another embodiment, if the current view distance changes to a second view distance (S409), the display format determination module 106 determines a third display format based on the first display format and a relation between the first view distance and the second view distance. The display format determination module 106 obtains size of the third display format by using an equation as follows:

$$\begin{cases} S_3 = S_1, & (D_2 < D_1) \\ S_3 = S_1 * (D_2 / D_1), & (D_2 \geq D_1) \end{cases}$$

where $S_3$ represents the size of the third display format, $S_1$ represents the size of the first display format, $D_2$ represents the second distance, and $D_1$ represents the first distance. Then the display control module 107 displays the content in the third display format on the display 130.

Although numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

Depending on the embodiment, certain steps or methods described may be removed, others may be added, and the sequence of steps may be altered. The description and the claims drawn for or in relation to a method may include some indication in reference to certain steps. However, any indication used is only to be viewed for identification purposes and not as a suggestion as to an order for the steps.

What is claimed is:

1. A computer-implemented method for adjusting display format in an electronic device, the method comprising:
   displaying content in a first display format on a display of the electronic device;
   continuously measuring current distance between a viewer and the display;
   starting a timer;
   when the current distance between the viewer and the display changes, restarting the timer;
   when the timer reaches a predetermined time, determining a second display format based on the first display format; and
   displaying the content in the second display format on the display;
   wherein the step of determining the second display format comprises obtaining size of the second display format by using an equation as follows:

$$S_2 = S_1 * (K * \sin(L * T_{view}) + N)$$

where $S_2$ represents the size of the second display format, $S_1$ represents size of the first display format, $T_{view}$ represents a time period that the timer times, and K, L and N represent constants.

2. The method of claim 1, further comprising:
   starting a second timer when the timer reaches the predetermined time; and
   when the second timer reaches a second predetermined time, displaying the content in the first display format.

3. The method of claim 1, further comprising moving the displayed content from a first location to a second location on the display when the timer reaches the predetermined time.

4. The method of claim 3, further comprising
   starting a second timer when the timer reaches the predetermined time; and
   when the second timer reaches a second predetermined time, moving the displayed content from the second location to the first location on the display.

5. The method of claim 1, further comprising:
   receiving the content for displaying in an original display format at the electronic device;
   determining a visual condition of the viewer; and
   determining the first display format based on the original display format and the visual condition of the viewer.

6. The method of claim 5, wherein the step of determining the visual condition of the viewer comprises:
   displaying a visual acuity test chart on the display;
   determining a visual acuity index by testing the viewer using the visual acuity test chart; and
   determining a minimal size relative to the visual acuity index, wherein the minimal size is a size of which a visual element smaller than is unrecognizable for the viewer.

7. The method of claim 6, wherein the step of determining the first display format comprises obtaining size of the first display format by using an equation as follows:

$$\begin{cases} S_1 = S_0, & (S_{min} \geq S_{va}) \\ S_1 = S_0 * (S_{va} / S_{min}), & (S_{min} < S_{va}) \end{cases}$$

where $S_1$ represents the size of the first display format, $S_0$ represents size of the original display format, $S_{va}$ represent the minimal size relative to the visual acuity index, $S_{min}$ represents size of the smallest visual element defined by the original display format.

8. The method of claim 5, further comprising:
   measuring a first distance between the viewer and the display before determining the visual condition of the viewer;

when the current distance between the viewer and the display has been changed to a second distance, determining a third display format based on the first display format and a relation between the first distance and the second distance; and displaying the content in the third display format on the display.

9. The method of claim 8, wherein the step of determining the third display format comprises obtaining size of the third display format by using an equation as follows:

$$\begin{cases} S_3 = S_1, & (D_2 < D_1) \\ S_3 = S_1 * (D_2/D_1), & (D_2 \geq D_1) \end{cases}$$

where $S_3$ represents the size of the third display format, $S_1$ represents size of the first display format, $D_2$ represents the second distance, $D_1$ represents the first distance.

10. A system for adjusting display format in an electronic device, the system comprising:
  a display control module configured for displaying content in a first display format on a display of the electronic device;
  a distance measurement module configured for continuously measuring current distance between a viewer and the display;
  a timer controller configured for starting a timer, wherein the timer controller is further configured for restarting the timer when the current distance between the viewer and the display changes;
  a display format determination module configured for determining a second display format based on the first display format when the timer reaches a predetermined time, wherein the display control module is further configured for displaying the content in the second display format on the display;
  wherein the display format determination module is configured for obtaining size of the second display format by using an equation as follows:

$$S_2 = S_1 * (K * \sin(L * T_{view}) + N)$$

where $S_2$ represents the size of the second display format, $S_1$ represents size of the first display format, $T_{View}$ represents a time period that the timer times, and K, L and N represent constants.

11. The system of claim 10, wherein the timer controller is further configured for starting a second timer when the timer reaches the predetermined time, and the display control module is further configured for displaying the content in the first display format when the second timer reaches a second predetermined time.

12. The system of claim 10, further comprising a content moving module configured for moving the displayed content from a first location to a second location on the display when the timer reaches the predetermined time.

13. The system of claim 12, wherein the timer controller is further configured for starting a second timer when the timer reaches the predetermined time, and the content moving module is further configured for moving the displayed content from the second location to the first location on the display when the second timer reaches a second predetermined time.

14. The system of claim 10, further comprising:
  a receiving module configured for receiving the content for displaying in an original display format at the electronic device; and
  a visual condition determination module configured for determining a visual condition of the viewer, wherein the display format determination module is further configured for determining the first display format based on the original display format and the visual condition of the viewer.

15. The system of claim 14, wherein the visual condition determination module is configured for displaying a visual acuity test chart on the display, determining a visual acuity index by testing the viewer using the visual acuity test chart, and determining a minimal size relative to the visual acuity index, where the minimal size is a size of which a visual element smaller than is unrecognizable for the viewer.

16. The system of claim 15, wherein the display format determination module is configured for obtaining size of the first display format by using an equation as follows:

$$\begin{cases} S_1 = S_0, & (S_{min} \geq S_{va}) \\ S_1 = S_0 * (S_{va}/S_{min}), & (S_{min} < S_{va}) \end{cases}$$

where $S_1$ represents the size of the first display format, $S_0$ represents size of the original display format, $S_{va}$ represent the minimal size relative to the visual acuity index, $S_{min}$ represents size of the smallest visual element defined by the original display format.

17. The system of claim 14, wherein the distance measurement module is further configured for measuring a first distance between the viewer and the display when the visual condition determination module determines the visual condition of the viewer, the display format determination module is further configured for determining a third display format based on the first display format and a relation between the first distance and the second distance upon a condition that the current distance between the viewer and the display has been changed to a second distance, and the display control module is further configured for displaying the content in the third display format on the display.

18. The system of claim 17, wherein the display format determination module is configured for obtaining size of the third display format by using an equation as follows:

$$\begin{cases} S_3 = S_1, & (D_2 < D_1) \\ S_3 = S_1 * (D_2/D_1), & (D_2 \geq D_1) \end{cases}$$

where S3 represents the size of the third display format, S1 represents size of the first display format, D2 represents the second distance, D1 represents the first distance.

* * * * *